US006901329B2

(12) United States Patent
Burg et al.

(10) Patent No.: US 6,901,329 B2
(45) Date of Patent: May 31, 2005

(54) BEACON-BASED ELECTRONIC GUIDE SYSTEM

(75) Inventors: Bernard Burg, Menlo Park, CA (US); Craig P. Sayers, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 167 days.

(21) Appl. No.: 10/060,571

(22) Filed: Jan. 29, 2002

(65) Prior Publication Data

US 2003/0144791 A1 Jul. 31, 2003

(51) Int. Cl.[7] .............................. G01S 3/02; G01C 11/26
(52) U.S. Cl. ....................... 701/200; 701/207; 701/208; 701/214; 342/357.09; 342/407
(58) Field of Search ................................. 701/200, 206, 701/207, 208, 213, 214, 215; 342/357.81, 357.13, 407

(56) References Cited

U.S. PATENT DOCUMENTS 5,250,955 A  * 10/1993 Major et al. ................. 342/457

6,173,239 B1    1/2001 Ellenby ....................... 702/150

* cited by examiner

Primary Examiner—Thomas G. Black
Assistant Examiner—Arthur D. Donnelly

(57) ABSTRACT

An electronic guide system is described that includes a fixed-location beacon located adjacent to a location which is associated with a plurality of landmarks to transmit electronic signals containing descriptive information of each of the landmarks. The guide system also includes a client device physically separated from the beacon to receive the electronic signals containing the descriptive information of each of the landmarks when placed by a user within a transmission range of the beacon. A viewing direction sensor is provided to determine viewing direction of the user to cause the client device to provide the user with the descriptive information of one of the landmarks at which the user is looking. An electronic guide system that includes a movable beacon is also described.

19 Claims, 7 Drawing Sheets

| VIEWING DIRECTION | DESCRIPTIVE INFORMATION |
|---|---|
| 10° ~ 15° TO NORTH | ALCATRAZ ISLAND |
| 15° ~ 30° TO NORTH | ANGEL ISLAND |
| 75° ~ 90° TO NORTH | GOLDEN GATE BRIDGE |
| 150° ~ 210° TO NORTH | FISHERMAN'S WHARF |
| 270° ~ 310° TO NORTH | BAY BRIDGE |

*Figure 2*

| RELATIVE VIEWING DIRECTION | DESCRIPTIVE INFORMATION |
|---|---|
| FRONT | ALCATRAZ ISLAND |
| FRONT | ANGEL ISLAND |
| LEFT | GOLDEN GATE BRIDGE |
| RIGHT | BAY BRIDGE |
| BEHIND | FISHERMAN'S WHARF |

*Figure 3*

BEACON-BASED ELECTRONIC GUIDE SYSTEM

BACKGROUND OF THE INVENTION

1. Field of the Invention

The present invention pertains to providing location-specific information. More particularly, this invention relates to a beacon-based electronic guide system that provides information about landmarks associated with a specific location.

2. Description of the Related Art

When people visit an area (e.g., a city, a park, an island, or a historical site), they want to go and see various tourist attractions within that area. For example, when people visit the city of San Francisco, they typically want to see the famous Golden Gate Bridge, the Fisherman's Wharf, and the Alcatraz Island. When people visit the Yosemite National Park located in the state of California, they want to see various landscapes within the Park, including the Half Dome, the El Capitan, the Cathedral Rock, the Yosemite Falls, and the Bridal Veil Falls. One way of seeing these tourist attractions is to go to the exact locations of these attractions. Another way is to go to some observation (i.e., viewing or vista) points to view these tourist attractions. This is due to the fact that many of these tourist attractions (e.g., the Golden Gate Bridge, the Alcatraz Island, and the Half Dome) can also be viewed from distance.

When a person looks at a tourist attraction at a distant observation point, the person typically would also like to get some descriptive information about the attraction. For example, when a visitor is looking at the Golden Gate Bridge, the visitor would like to know some background information about the Bridge. The background information may describe the structure of the Bridge (e.g., cable-suspension or arched), the year the Bridge was built, the architect who designed the Bridge, and the material (e.g., steel cables) used to build the Bridge, etc. The background information may also include a map showing the area, or a graphical illustration of the Bridge.

In order to provide the information, a guidepost or a plaque containing the background information is typically raised either at an observation point or at the site of the Bridge. Similarly, guideposts, signposts, and/or plaques have been provided at various observation points in the Yosemite National Park, as well as other tourist attraction areas.

However, this mechanism of providing background or descriptive information using guideposts bears many disadvantages. One disadvantage is that a physical board needs to be permanently erected at the observation point to form the guidepost. The background or descriptive information is then made (e.g., inscribed, imprinted, impressed, or posted) on the board. This typically requires human resources to complete the job. In addition, regular and periodical maintenance is typically required to fend off any damage to the posted information that may be caused by natural erosion and/or human vandalism. This also requires significant human resources.

Another disadvantage is that each physical board can only be viewed by one individual or a relatively small group of people at a time. To allow for a larger crowd to read the posted information, many more boards may need to be erected at the site. This again requires resources. In addition, many man-made or artificial objects at the site of the observation points may adversely affect the surrounding landscape.

A further disadvantage is that manual update is typically required if the posted information needs to be updated. In this case, a human being must come to the site and physically updates the information on the display board. This means that the information updating process is a long and slow process, which does not provide people with accurate information cost-effectively and efficiently.

As the cost of labor continues to increase, this mechanism of providing background or descriptive information using guideposts may be prohibitively costly. Thus, there exists a need for a better and improved mechanism to post information efficiently and effectively.

SUMMARY OF THE INVENTION

One feature of the present invention is to allow for easy, quick, and convenient electronic access to information of different landmarks of interest.

Another feature of the present invention is to provide an electronic guide system that provides information for different landmarks of interest.

A further feature of the present invention is to provide an electronic guide system that provides location-specific information for different landmarks of interest.

In accordance with one embodiment of the present invention, an electronic guide system is provided that includes a fixed-location beacon located at a location which is associated with a plurality of landmarks to transmit electronic signals containing descriptive information of each of the landmarks. The guide system also includes a client device physically separated from the beacon to receive the electronic signals containing the descriptive information of each of the landmarks when placed by a user within a transmission range of the beacon. A viewing direction sensor is provided to determine viewing direction of the user to cause the client device to provide the user with the descriptive information of one of the landmarks at which the user is looking.

In accordance with another embodiment of the present invention, an electronic guide system is provided that includes a movable beacon that (1) determines a current location of the movable beacon to obtain descriptive information of each of a plurality of landmarks associated with the current location, and (2) transmits electronic signals containing the descriptive information of each of the landmarks. The guide system also includes a client device that is physically separated from the beacon to receive the electronic signals containing the descriptive information of each of the landmarks when placed by a user within a transmission range of the beacon. A relative location sensor is provided that determines relative location of the client device with respect to the movable beacon to cause the client device to selectively provide the user with the descriptive information of some of the landmarks based on the relative location of the client device.

In accordance with another embodiment of the present invention, an electronic guide system is provided that includes a movable beacon that (1) determines a current location of the movable beacon to obtain descriptive information of each of a plurality of landmarks associated with the current location, (2) selects the descriptive information of some of the landmarks based on a relative location of a physical point with respect to the movable beacon, and transmits electronic signals containing the descriptive information of the some of the landmarks. A client device is provided that receives the electronic signals containing the descriptive information of the some of the landmarks when the client device is at the relative location of the physical point.

Other features and advantages of the present invention will become apparent from the following detailed description, taken in conjunction with the accompanying drawings, illustrating by way of example the principles of the invention.

BRIEF DESCRIPTION OF THE DRAWINGS

FIG. 2 shows one organization of the descriptive information broadcast by the beacon of FIG. 1.

FIG. 3 shows another organization of the descriptive information broadcast by the beacon of FIG. 1.

DETAILED DESCRIPTION OF THE INVENTION

Figure 1:
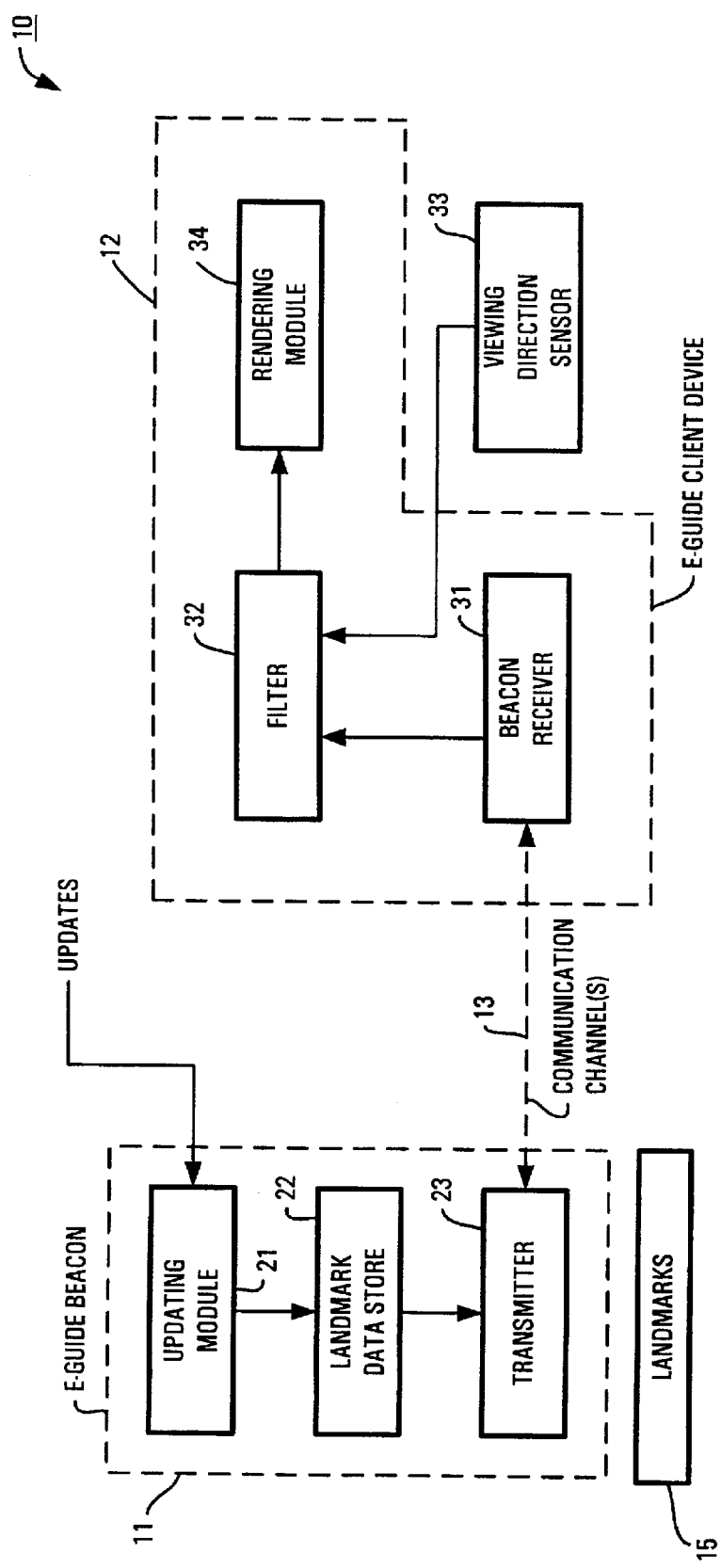
FIG. 1 illustrates a beacon-based electronic guide system that implements one embodiment of the present invention, wherein the system includes a fixed-location beacon and a moving client device.

FIG. 1 shows a beacon-based electronic guide (i.e., e-guide) system 10 that implements one embodiment of the present invention. In accordance with one embodiment of the present invention, the guide system 10 is used to electronically provide descriptive information of a nearby landmark at which the user of the system 10 is looking.

In accordance with one embodiment of the present invention, the guide system 10 includes an e-guide beacon 11, an e-guide client device 12, and a viewing direction sensor 33. The beacon 11 is located adjacent to a location which is associated with a number of landmarks 15 that are viewable from the location, and is used to transmit electronic signals containing descriptive information and viewing direction information of each of the landmarks 15. The client device 12 is physically separated from the beacon 11, and is used to receive the electronic signals containing the descriptive and viewing direction information of the landmarks 15 when within a transmission range of the beacon 11. The viewing direction sensor 33 determines the viewing direction of the user to cause the client device 12 to provide the user with only the descriptive information of one of the landmarks 15 at which the user is looking.

During operation, the beacon 11 transmits or broadcasts electronic signals containing the descriptive and viewing direction information of the landmarks 15. When client device 12 is placed by a user in the transmission range of the beacon 11, the client device 12 receives the electronic signals. The client device 12 also receives the viewing direction information of the user from the viewing direction sensor 33. The client device 12 then only provides the descriptive information of one of the landmarks 15 whose viewing direction substantially matches the viewing direction of the user.

The client device 12 may detect beacon signals from multiple beacons when several beacons are nearby. In this case, the client device 12 may need to selectively receive the beacon signals from only one of the beacons. One way of achieving this is to choose a beacon based on signal strength. Another way is to always prefer one type of beacon over another type of beacon. Another way is to annotate the transmitted information with additional content (such as the date at which it was last updated, or the language in which it is presented) and use that content to decide which beacon to select. The guide system 10 will be described in more detail below, also in conjunction with FIGS. 1 through 4.

Referring to FIG. 1, the e-guide beacon 11 is a fixed-location beacon located adjacent to a location which is associated with the landmarks 15. The term adjacent to means that the e-guide beacon 11 can be placed or located at, in, on, over, next to, or near the location at which people can view the landmarks 15. For example, the landmarks 15 can be located at different locations from each other and the beacon 11 is placed at a location that is near all of the landmarks 15. As a further example, the beacon 11 can be placed at, in, on, over, or next to one of the landmarks 15 while being near the others of the landmarks 15.

In one embodiment, the beacon 11 is placed at an observation point that is near the landmarks 15. In another embodiment, the beacon 11 is placed at a location of one of the landmarks 15 while being near the other ones of the landmarks 15.

It is to be noted that throughout the entire specification, including drawings and claims, the term beacon is defined as an electronic device or system that performs at least two functions. One is to receive information (e.g., descriptive information of the landmarks 15). The received information can then be stored in the beacon. The other function is to transmit electrical or electronic signals embedding the information.

The term landmark hereinafter refers to building, building complex, wall, castle, palace, temple/church, mosque, billboard, statue, road, freeway/highway, railway, bridge, harbor, airport, bus/rail/underground station, monument, mountain, mountain peak, rock, tree, forest, island, ocean, sea, bay, strait, river, lake, creek, reservoir, dam, boat, ship, airplane, painting, sculpture, planet, or star, etc. As a matter of fact, the term landmark hereinafter refers to any natural or man-made physical object or point of interest. Alternatively, the term landmark can also be replaced with other terms, such as tourist attraction or object/point of interest.

The descriptive information for each of the landmarks 15 includes information relating to or describing the corresponding landmark. Basic descriptive information of a landmark typically includes name of the landmark (e.g., the Crater Lake, the Alcatraz Island, the Golden Gate Bridge, and the Eiffel Tower). In addition, the descriptive information may include background information of the landmark. The background information may include geographical and/or geological information of the landmark. The background information may also describe the structure (or formation) of the corresponding landmark, the year the landmark was discovered, named, or built, etc. In addition, the background information may include a map showing the area, or an illustration of the landmark with various special features highlighted. For example, the background information of the Golden Gate Bridge may describe the structure of the Bridge (e.g., cable-suspension or arched), the year the Bridge was built, the architect who designed the Bridge, and the material (e.g., steel cables) used to build the Bridge, etc. The background information may also include a map showing the area, or an illustration of the Bridge. The descriptive information of a landmark may also include information relating to services (e.g., hotels, restaurants, gift shops, gas stations, entertainments, information desks, banks, etc.) provided at the site of the landmark.

In one embodiment, the descriptive information is in the form written text and/or image that can be rendered on a display for viewing. In another embodiment, the descriptive information is in the form of audio signal stream that can be rendered by an audio player. Alternatively, the descriptive information can be in other forms.

The viewing direction information of one of the landmarks 15 indicates the orientation of the landmark from the location of the beacon 11 (i.e., viewing direction). The descriptive information of a landmark is associated with the viewing direction information of the landmark. The viewing direction information can be in the form of absolute direction (i.e., 10° to North) or relative direction (i.e., front, behind, left, or right).

For example, when the beacon 11 is placed along the shore in front of the Fisherman's Wharf in the city of San Francisco, the nearby landmarks 15 can be the Alcatraz Island, the Angle Island, the Golden Gate Bridge, the Fisherman's Wharf, and the Bay Bridge. In this case, the descriptive information and the viewing direction information of each of the landmarks 15 can be organized in a number of ways. FIG. 2 shows one example of such organization. As can be seen from FIG. 2, the viewing direction information is in absolute form. FIG. 3 shows another example of such organization. As can be seen from FIG. 3, the viewing direction information is in relative form.

Alternatively, the viewing direction information can include new constraints which may include computations using information in the client device (e.g., the current time). For example, at the lookout over an airport, we could transmit "flight 840 to Miami" (i.e., the descriptive information) along with the constraints: (i) the time is between 9:00 am and 9:02 am, (2) the client device is pointed toward the south end of the runway, and (3) the device has a language preference for English. As a further example, when at a pier on a harbor, the descriptive information "the carnival cruise ship" can be transmitted along with the constraint that the viewing direction is horizontal, and at an angle to North which is within 5 degrees of 30+10*(1:00 pm—current_time).

Referring back to FIG. 1, the structure of the beacon 11 is now described. As can be seen from FIG. 1, the beacon 11 includes an updating module 21, a landmark data store 22, and a transmitter 23. In one embodiment, the beacon 11 is a physically integrated device or system, with all of the modules 21–23 residing within a single enclosure. In another embodiment, the beacon 11 is not a physically integrated device or system. In this case, the modules 21–23 of the beacon 11 may reside in different enclosures, and with intermittent connectivity.

The landmark data store 22 of the beacon 11 receives the descriptive information of each of the landmarks 15, as well as the viewing direction information of each of the landmarks 15. As described above, the viewing direction information for all of the landmarks 15 is measured from the location of the beacon 11. The landmark data store 22 is connected to the updating module 21 to receive all information it stores. This allows the data store 22 to be electronically updated with new information. The data store 22 can store information volatilely or non-volatilely.

The updating module 21 of the beacon 11 is used to access external source to retrieve the descriptive and viewing direction information of a landmark, as well as any updates to the retrieved information. The external information source can be an Internet site or web page. As described above, the descriptive information of a landmark may include information about services (e.g., restaurants) at the landmark. For example, the descriptive information may describe a particular restaurant at the landmark. In this case, the descriptive information may also show today's menu and the waiting line at the very moment at the restaurant. These two items of information are date and time specific and thus need to be obtained in real time from the web server of the restaurant. In this case, the updating module 21 generates and sends requests to external Internet sites. This allows the updating module 21 to receive in real time the most recent update of the descriptive information. The structure of the updating module 21 is not shown, but generally includes a communication interface and an update request module. The communication interface is used to interface with an external communication network so that communication can be established for the update request module. The communication interface can be a wireless communication interface or wire-line communication interface. The update request module is used to generate and send requests (e.g., Universal Resource Locator) to external Internet sites via the Internet and the communication interface. This allows the updating module 21 to receive in real time the most recent update of the contextual information.

Once the descriptive information and the viewing direction information of each of the landmarks 15 are stored in the data store 22, they can be electronically transmitted or broadcast out of the beacon 11. This is done by the transmitter 23 of the beacon 11. As can be seen from FIG. 1, the transmitter 23 is connected to the data store 22. This means that the transmitter 23 receives the descriptive information and the viewing direction information of the landmarks 15 from the data store 22 and electronically transmits the information out of the beacon 11 via the external communication channel 13. The transmitter 23 can be implemented using any known communication technology.

In one embodiment, the transmitter 23 constantly transmits the electronic signals. In another embodiment, the transmitter 23 periodically transmits the electronic signals. Alternatively, the transmitter 23 transmits the electronic signals whenever activated by external stimulus.

The transmitter 23 can transmit the electronic signals wireless or through wire-lines. The transmission range of the transmitter 23 is determined by the communication technology adopted by the transmitter 23. In one embodiment, the communication technology employed by the transmitter 23 can be a short range wireless technology such as infrared (e.g., the IrDA technology developed by several companies including Hewlett-Packard Company of Palo Alto, Calif.), ultra-sound, or the low power, high frequency, short-range radio (2.4–5 Ghz) transmission (e.g., the Bluetooth technology developed by several telecommunications and electronics companies). In this case, the transmission range of the transmitter 23 can be approximately three to six feet. In another embodiment, the transmitter 23 is a long range transmitter.

If the transmitter 23 transmits signals through wire-lines, the transmission range of the transmitter 23 is determined by the length of the wire-lines. In this case, the wire-lines can be metal cables, wires, or fiber optic cables.

The communication channel 13 can be metal wires or just the atmosphere, depending on the communication technology adopted by the transmitter 23. When the transmitter 23 employs wireless transmission technology, the communication channel 13 is just the atmosphere. When the transmitter 23 transmits the electronic signals through wire-lines, then the communication channel 13 includes wires that are connected to the transmitter 23.

The communication channel 13 can have a single communication channel or multiple communication channels to transmit the electronic signals. When the communication channel 13 contains multiple channels, the transmitter 23 can transmit the descriptive information and the viewing direction information of each of the landmarks 15 in one of the channels. When the communication channel 13 contains a single channel, the transmitter 23 can transmit the descriptive information and the viewing direction information of the landmarks 15 sequentially, each landmark at a time, through the communication channel 13.

As described above, the client device 12 is a movable device and is physically separated from the beacon 11. The client device 12 includes a beacon receiver 31 to receive the transmitted information from the transmitter 23 of the beacon 11.

As also described above, the client device 12 may detect beacon signals from multiple beacons when several beacons are nearby. In this case, the beacon receiver 31 of the client device 12 may need to selectively receive the beacon signals from only one of the beacons. One way of achieving this is to choose a beacon based on signal strength. Another way is to always prefer one type of beacon over another type of beacon. Another way is to annotate the transmitted information with additional content (such as the date at which it was last updated, or the language in which it is presented) and use that content to decide which beacon to select.

In addition, the client device 12 includes a filter 32 that receives the descriptive and viewing direction information of the landmarks 15 from the receiver 31. The filter 32 also receives the current viewing direction information of the user from the viewing direction sensor 33. As described above, the viewing direction sensor 33 determines the current viewing direction of the user that holds the client device 12.

In one embodiment, the viewing direction sensor 33 is physically integrated with the client device 12. In this case, the sensor 33 measures the direction of the client device 12 and this direction is assumed to be the viewing direction of the user holding the client device 12. In another embodiment, the sensor 33 is separated from the client device 12, and measures only the viewing direction of the user who holds the sensor 33.

The sensor 33 can be of any kind of viewing direction (or orientation) sensor. In one embodiment, the sensor 33 is a digital compass. Alternatively, the sensor 33 can be implemented by other known means.

Figure 4:
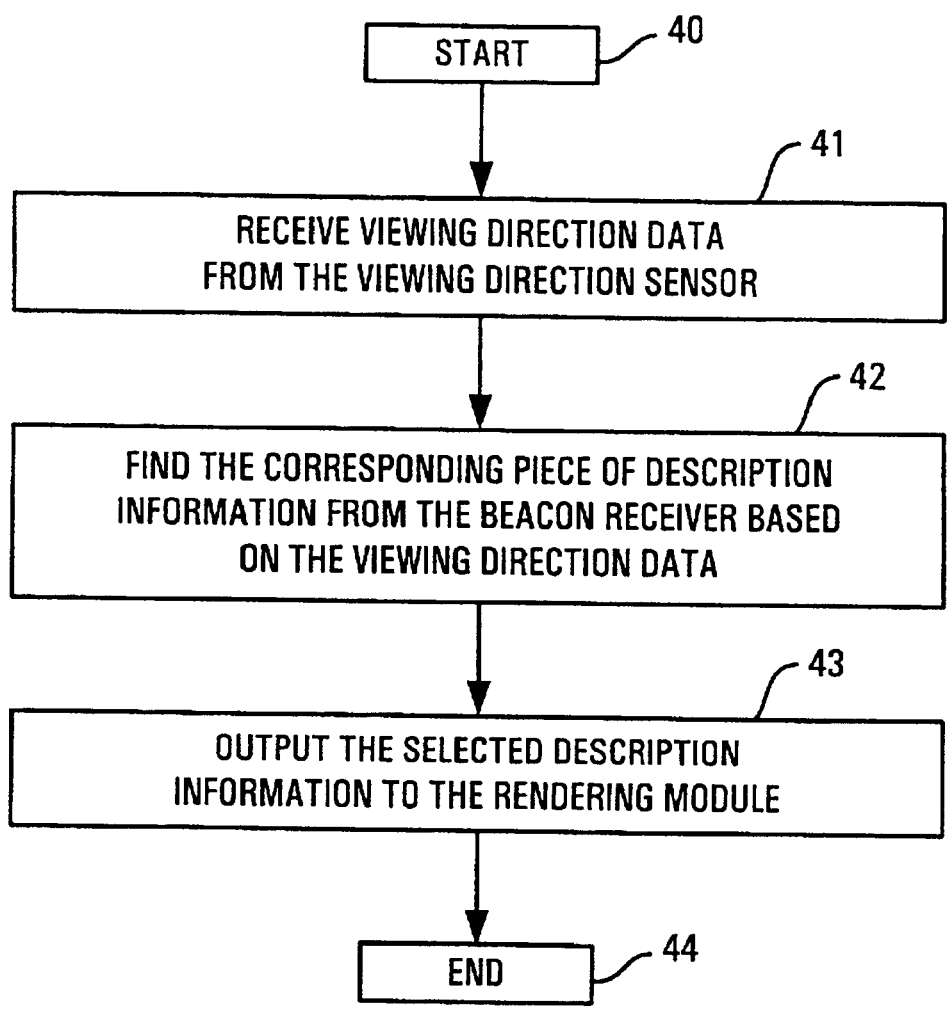
FIG. 4 shows in flow chart diagram form the filtering process of the client device to filter out the descriptive information of the landmark based on the viewing direction data from the viewing directional sensor.

The filter 32 of the client device 12 filters out the descriptive information of the landmark at which the user is currently viewing. This means that the filter 32 only takes the descriptive information of a landmark that has its viewing direction substantially corresponding to the viewing direction of the user obtained from the sensor 33. The filter 32 then sends the filtered out descriptive information to the rendering module 34 for rendering. FIG. 4 shows the filtering process of the filter 32, which will be described in more detail below.

Referring to FIG. 4, the process starts at the step 40. At the step 41, the filter 32 of FIG. 1 receives the viewing direction data of the user from the viewing direction sensor 33 (FIG. 1). At the step 42, the filter 32 finds the corresponding piece of descriptive information from the receiver 31 based on the viewing direction data from the sensor 33. This means that the filter 32 finds the descriptive information of a landmark that has its viewing direction data matching the viewing direction data obtained from the sensor 33. This means that the filter 32 only provides the descriptive information of a landmark at which the user of the client device 12 is currently viewing or looking.

At the step 43, the filter 32 outputs the selected descriptive information to the rendering module 34 of the client device 12 for rendering. The process then ends at the step 44.

Referring back to FIG. 1, the rendering module 34 of the client device 12 renders to the user the descriptive information of the landmark at which the user is looking. The rendering module 34 can be implemented either as a display to display the descriptive information to the user of the client device 12, or as an audio player that audibly outputs the descriptive information through a speaker.

In one embodiment, the rendering module 34 is a display. In another embodiment, the rendering module 34 is implemented by an audio playback system.

Figure 5:
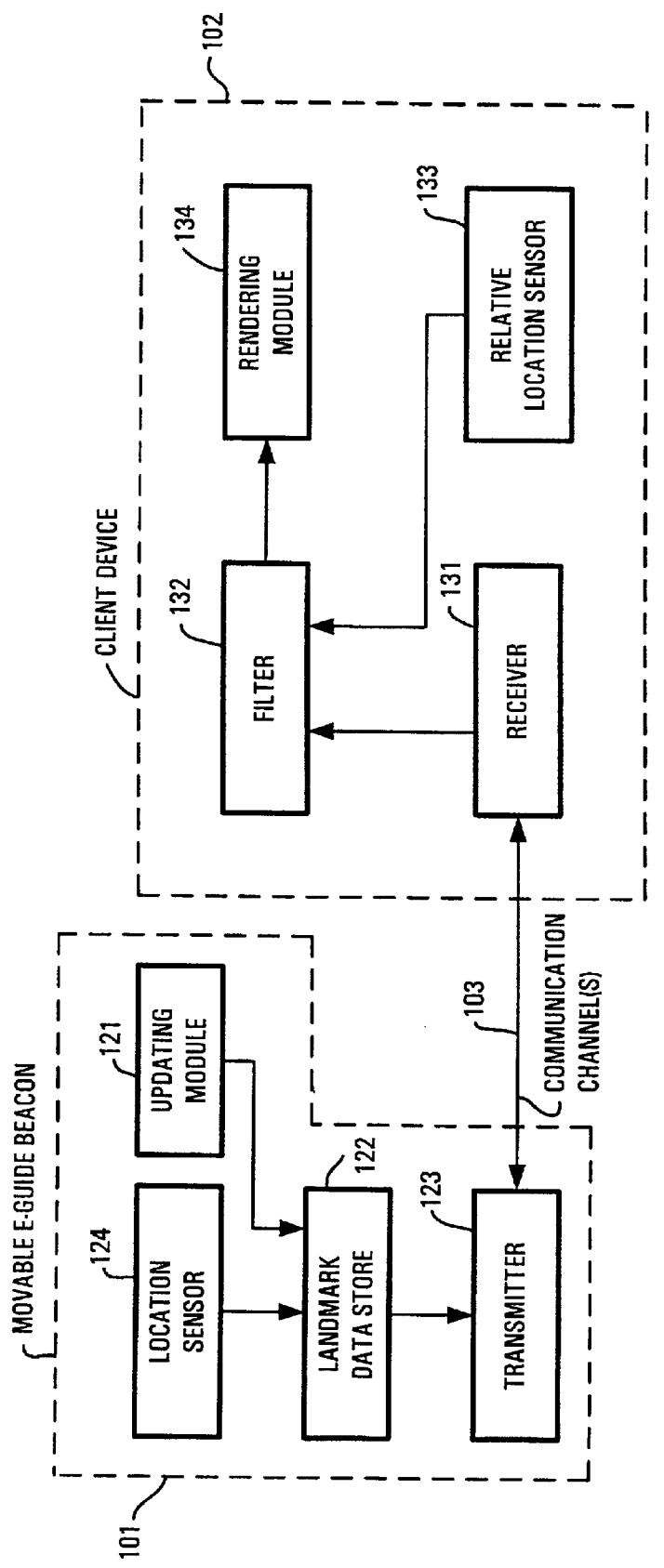
FIG. 5 illustrates another beacon-based electronic guide system that implements another embodiment of the present invention, wherein the system includes a movable beacon and a client device.

FIG. 5 shows another beacon-based electronic guide system 100 that implements another embodiment of the present invention. In FIG. 5, the guide system 100 includes an e-guide beacon 101 and a client device 102. Unlike the beacon 11 of FIG. 1, the beacon 101 of FIG. 5 is movable, and does not have a fixed location. In this case, the beacon 101 stores the descriptive information of all landmarks which might be visited by the user of the guide system 100. For example, if the guide system 100 is to be used in the city of San Francisco, then the movable beacon 101 will contain the descriptive information of all landmarks within the city of San Francisco. The structure of the movable beacon 101 will be described in more detail below.

As can be seen from FIGS. 1 and 5, the difference between the beacon 11 of FIG. 1 and the beacon 101 of FIG. 5 is that the beacon 101 of FIG. 5 includes a location sensor 124 that determines the current location of the beacon 101. This is due to the fact that the beacon 101 is a movable beacon. The location sensor 124 can be implemented using the Global Positioning System (i.e., GPS). The location sensor 124 can also be implemented using other well known location determination technology.

In addition, the landmark data store 122 of the beacon 101 of FIG. 5 stores the descriptive and viewing direction information of all the landmarks that the user of the guide system 100 of FIG. 5 might visit. This is different from the data store 22 of the beacon 11 of FIG. 1 because the beacon 101 of FIG. 5 is a movable beacon, not a fixed-location beacon. Moreover, the data store 122 also stores a list of beacon locations, each being associated with a set of landmarks. This is also due to the fact that the beacon 101 is a movable beacon.

During operation, the location sensor 124 determines the current location of the beacon 101. The current beacon location information is then sent to the landmark data store 122 to select a set of landmarks associated with the current location information. When the beacon 101 moves to a new location, the location sensor 124 of the beacon 101 will detect a new current beacon location and the landmark data store 122 will select a new set of landmarks associated with the new location.

The modules 121 and 123 of the beacon 101 (FIG. 5) function similarly as their counterpart modules 21 and 23 of the beacon 11 of FIG. 1, and thus will not be described in more detail below. The transmitter 123 transmits the descriptive and viewing direction information of each of the selected landmarks to the client device 102 via the communication channel 103. The communication channel 103 also functions similarly as the counterpart communication channel 13 and thus will not be described in more detail below.

The client device 102 of the guide system 100 of FIG. 5 can be movable or in a predetermined fixed relation with the movable beacon 101. The client device 102 includes a receiver 131, a filter 132, a relative location sensor 133, and a rendering module 134. The receiver 131 and the rendering module 134 function similarly as the receiver 31 and the rendering module 34 of the client device 12 of FIG. 1, and thus will not be described in more detail below.

The relative location sensor 103 is used to determine the relative location of the client device 102, and hence the relative location of the user that holds the client device 102. This allows the client device 102 to decide to present its user with the descriptive information of which of the landmarks transmitted from the beacon 101. The relative location means the relative location of the client device 102 with respect to the location of the beacon 101. For example, the beacon 101 can be fixed in the front of a tour bus and the client device 102 and its user can be sitting on the left (or right) side of the bus. In this case, the location sensor 124 of the beacon 101 determines the current location of the beacon 101 on earth, and the relative location sensor 133 determines the relative location of the client device 102 with respect to the current location of the beacon 101. If the client device (as well as its user) is five feed on the left of the beacon 101, the relative location sensor 133 will indicate that the client device 102 is five feet left and behind (or northwest or southeast) the beacon 101. The relative location sensor 133 can provide the relative location information in relative form (i.e., left, right, front, and behind) or absolute form (i.e., northeast, northwest, southeast, southwest).

In one embodiment, the relative location sensor 133 is within the client device 102. In another embodiment, the relative location sensor 133 is outside the client device 102 as a separate unit.

Moreover, in one embodiment, the relative location sensor 133 is replaced with a viewing direction sensor similar to the viewing direction sensor 33 of FIG. 1. This means that the replaced sensor functions substantially same as the sensor 33 of FIG. 1 does.

Figure 6:
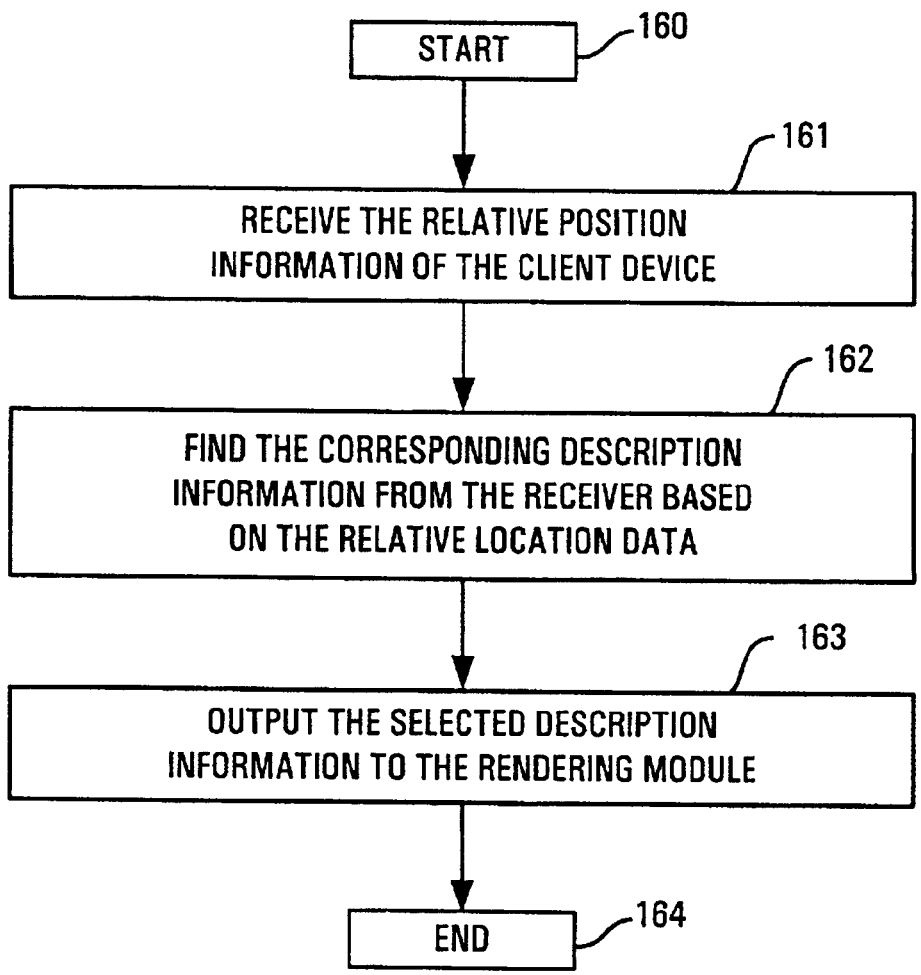
FIG. 6 shows in flow chart diagram form the filtering process of the client device based on the relative location information of the client device with respect to the movable beacon.

The relative location information from the relative location sensor 133 is applied to the filter 132. The filter 132 is used to select the landmarks that can be viewed by the user of the client device 102. The filter 132 selects the landmarks based on the relative location of the client device 102 and the viewing direction of all the landmarks that are transmitted from the beacon 101. This means that if the relative location information indicates that the client device 102 is on the northwest side of the beacon 101, the filter 132 only selects landmarks that are on the northwest side of the beacon 101. FIG. 6 shows the filtering process of the filter 132, which will be described in more detail below.

In addition and as can be seen from FIG. 5, the guide system 100 does not include any viewing direction sensor. Alternatively, a viewing direction sensor may be provided for the guide system 100. If a viewing direction sensor is provided for the guide system 100, the viewing direction data from the sensor is also applied to the filter 132 of the client device 102.

As can be seen from FIG. 6, the process starts at the step 160. At the step 161, the filter 132 of FIG. 5 receives the relative location data of the client device 102 and its user from the relative location sensor 133 (FIG. 5). At the step 162, the filter 132 finds the descriptive information of one or more landmarks based on the relative location data from the sensor 133 and the viewing direction information of each of the landmarks. This means that the filter 32 finds the descriptive information of one or more landmarks that can be viewed by the users at the relative location. For example, if the relative location data indicates that the client device 102 (as well as its user) is on the left side of the beacon 101, the filter 132 will only select the landmarks that are on the left side of the beacon 101. This is done by comparing the relative location data with the viewing direction information of each of the landmarks transmitted by the beacon 101 of FIG. 5.

At the step 163, the filter 132 outputs the selected descriptive information to the rendering module 134 of the client device 102 for rendering. The process then ends at the step 164.

Figure 7:
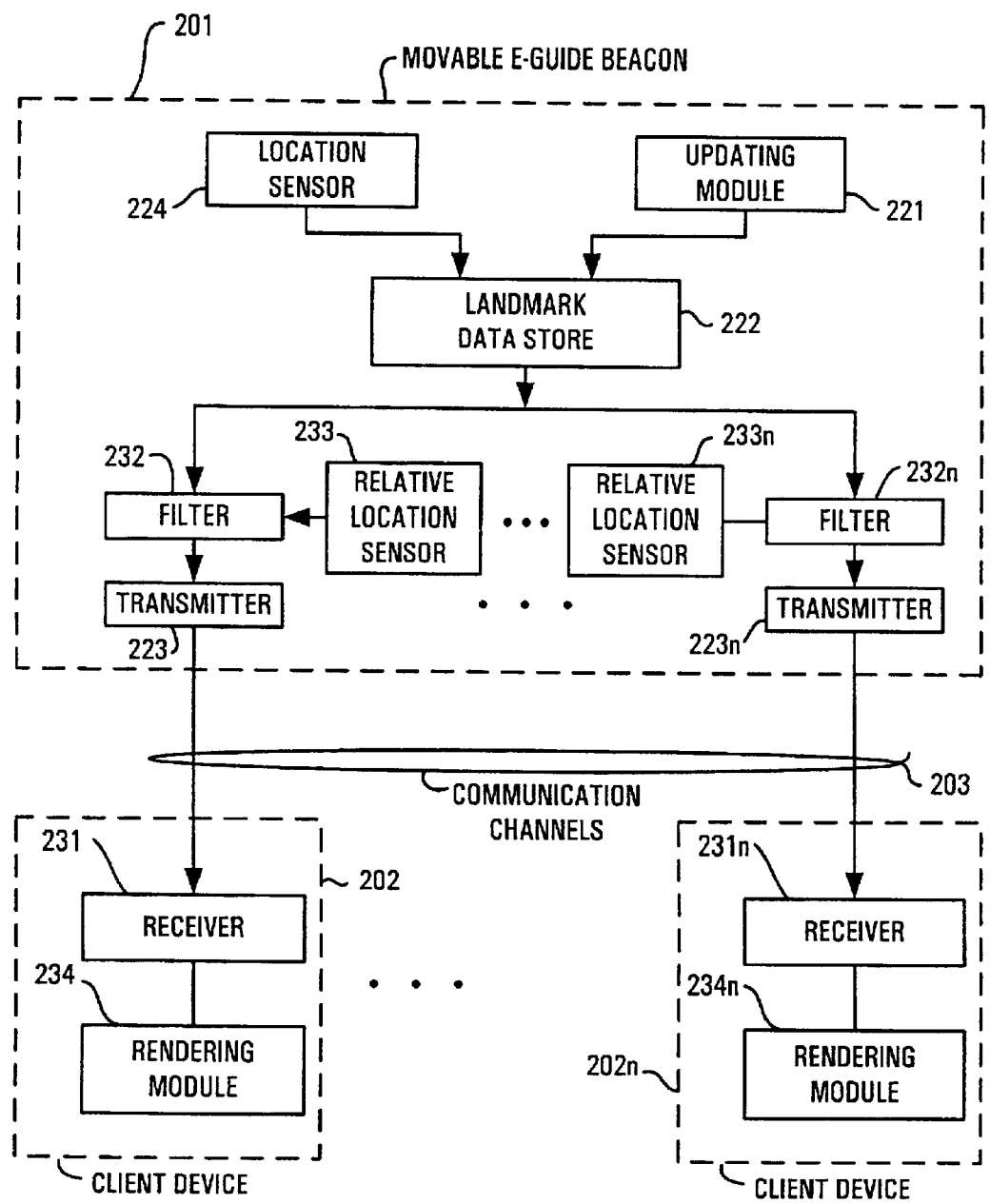
FIG. 7 shows another implementation of the electronic guide system of FIG. 5.

FIG. 7 illustrates another beacon-based electronic guide system 200 that implements another embodiment of the present invention. As can be seen from FIGS. 5 and 7, both systems employ a movable beacon (i.e., the beacon 101 and the beacon 201). The difference is that the beacon 201 of the system 200 of FIG. 7 also contains the filter (i.e., the filters 232–232n) and the relative location sensor (i.e., the relative location sensors 233–233n) for each client device (i.e., the client devices 202–202n). In addition, each client device (i.e., each of the client devices 202–202n) only contains a receiver (i.e., one of the receivers 231–231n) and a rendering module (i.e., one of the rendering module 234–234n).

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. An electronic guide system, comprising:
   a movable beacon that (1) determines a current location of the movable beacon to obtain descriptive information of each of a plurality of landmarks associated with the current location, and (2) transmits electronic signals containing the descriptive information of each of the landmarks;
   a client device physically separated from the beacon to receive the electronic signals containing the descriptive information of each of the landmarks when placed by a user within a transmission range of the beacon;
   a relative location sensor that determines relative location of the client device with respect to the movable beacon to cause the client device to selectively provide the user with the descriptive information of some of the landmarks based on the relative location of the client device.

2. The electronic guide system of claim 1, wherein the movable beacon further comprises
   a landmark database that stores location information and the descriptive information of (1) the landmarks associated with the current location of the movable beacon and (2) other landmarks;
   a location sensor that senses the current location of the movable beacon, wherein the current location is used to access the landmark database for the descriptive information of the landmarks associated with the current location of the movable beacon;

a transmitter that transmit electronic signals containing the descriptive information of the landmarks associated with the current location.

3. The electronic guide system of claim 2, wherein the transmitter transmits the electronic signals periodically, constantly, or only when activated by external stimulus.

4. The electronic guide system of claim 2, wherein the movable beacon further comprises an updating module that updates the descriptive information stored in the landmark database.

5. The electronic guide system of claim 2, wherein the transmitter transmits the electronic signals wirelessly or through a wire-line, wherein if the transmitter transmits the electronic signals through a wire-line, the client device is regarded to be within the transmission range of the beacon when the client device is physically coupled to the transmitter of the beacon by the wire-line.

6. The electronic guide system of claim 2, wherein the transmitter transmits the descriptive information of the landmarks using multiple communication channels, each channel for transmitting the electronic signals of the descriptive information of one of the landmarks.

7. The electronic guide system of claim 2, wherein the transmitter multiplexes the electronic signals containing the descriptive information of the landmarks such that the descriptive information of the landmarks is transmitted by a single communication channel.

8. The electronic guide system of claim 1, wherein the relative location sensor is located within the client device.

9. An electronic guide system, comprising:

a movable beacon that (1) determines a current location of the movable beacon to obtain descriptive information of each of a plurality of landmarks associated with the current location, (2) selects the descriptive information of some of the landmarks based on a relative location of a physical point with respect to the movable beacon, and transmits electronic signals containing the descriptive information of the some of the landmarks;

a client device that receives the electronic signals containing the descriptive information of the some of the landmarks when the client device is at the relative location of the physical point.

10. The electronic guide system of claim 9, wherein the movable beacon further comprises a landmark database that stores location information and the descriptive information of (1) the landmarks associated with the current location and (2) other landmarks;

a location sensor that senses the current location of the movable beacon, wherein the current location is used to access the landmark database for the descriptive information of the landmarks associated with the current location;

a relative location sensor that determines relative location of the client device with respect to the movable beacon to select the descriptive information of some of the landmarks based on the relative location of the client device;

a transmitter that transmit electronic signals containing the descriptive information of the some of the landmarks.

11. The electronic guide system of claim 10, wherein the transmitter transmits the electronic signals periodically, constantly, or only when activated by external stimulus.

12. The electronic guide system of claim 10, wherein the movable beacon further comprises an updating module that updates the descriptive information stored in the landmark database.

13. The electronic guide system of claim 10, wherein the transmitter transmits the electronic signals wirelessly or through a wire-line, wherein if the transmitter transmits the electronic signals through a wire-line, the client device is regarded to be within the transmission range of the beacon when the client device is physically coupled to the transmitter of the beacon by the wire-line.

14. The electronic guide system of claim 10, wherein the transmitter transmits the descriptive information of the landmarks using multiple communication channels, each channel for transmitting the electronic signals of the descriptive information of one of the landmarks.

15. The electronic guide system of claim 10, wherein the transmitter multiplexes the electronic signals containing the descriptive information of the landmarks such that the descriptive information of the landmarks is transmitted by a single communication channel.

16. An electronic guide system, comprising:

a movable beacon that (1) determines a current location of the movable beacon to obtain descriptive information of each of a plurality of landmarks associated with the current location, and (2) transmits electronic signals containing the descriptive information of each of the landmarks;

a client device physically separated from the beacon to receive the electronic signals containing the descriptive information of each of the landmarks when placed by a user within a transmission range of the beacon;

a viewing direction sensor that determines viewing direction of the user of the client device to cause the client device to provide the user with the descriptive information of one of the landmarks at which the user is looking.

17. The electronic guide system of claim 16, wherein the movable beacon further comprises a landmark database that stores location information and the descriptive information of (1) the landmarks associated with the current location of the movable beacon and (2) other landmarks;

a location sensor that senses the current location of the movable beacon, wherein the current location is used to access the landmark database for the descriptive information of the landmarks associated with the current location of the movable beacon;

a transmitter that transmit electronic signals containing the descriptive information of the landmarks associated with the current location.

18. The electronic guide system of claim 16, wherein the viewing direction sensor is located within the client device.

19. The electronic guide system of claim 16, wherein the viewing direction sensor is located external to the client device.

* * * * *